United States Patent [19]

Niwa et al.

[11] Patent Number: 5,543,478

[45] Date of Patent: Aug. 6, 1996

[54] METHOD FOR OPERATING REACTOR FOR POLYMERIZING OLEFINS

[75] Inventors: Masahiro Niwa; Yuji Sugano; Ken-ichi Uenishi, all of Yokohama; Hideto Kitada; Yoshihisa Yamaguchi, both of Kawasaki; Eiko Kobayashi, Yokosuka; Kunimichi Kubo; Akira Sano, both of Tokyo, all of Japan

[73] Assignee: Nippon Petrochemicals Company, Limited, Tokyo, Japan

[21] Appl. No.: 174,269

[22] Filed: Dec. 28, 1993

[30] Foreign Application Priority Data

Dec. 29, 1992 [JP] Japan ..................... 4-360307
Dec. 30, 1992 [JP] Japan ..................... 4-360001
Dec. 30, 1992 [JP] Japan ..................... 4-360004

[51] Int. Cl.$^6$ ........................... C08F 2/38
[52] U.S. Cl. .............................. 526/82; 526/84
[58] Field of Search ............................ 526/82, 84

[56] References Cited

U.S. PATENT DOCUMENTS

| | | | |
|---|---|---|---|
| 3,708,65 | 1/1973 | Dietrich et al. | 526/82 |
| 3,971,768 | 7/1976 | Peters et al. | 526/68 |
| 4,006,101 | 2/1977 | Matsuura et al. | 252/429 C |
| 4,022,958 | 5/1977 | Matsuura et al. | 526/124 |
| 4,035,560 | 7/1977 | Caumartin et al. | 526/124 |
| 4,061,857 | 12/1977 | Kuroda et al. | 526/114 |
| 4,065,611 | 12/1977 | Miyoshi et al. | 526/124 |
| 4,083,802 | 4/1978 | Matsuura et al. | 252/429 C |
| 4,202,953 | 5/1980 | Matsuura et al. | 526/125 |
| 4,315,999 | 2/1982 | Matsuura et al. | 526/114 |
| 4,326,048 | 4/1982 | Stevens et al. | 526/84 |
| 4,396,534 | 8/1983 | Matsuura et al. | 252/429 B |
| 4,507,448 | 3/1985 | Kuroda et al. | 526/125 |
| 4,532,311 | 7/1985 | Fulks et al. | 526/62 |
| 5,034,479 | 7/1991 | Eisinger et al. | 526/68 |
| 5,077,358 | 12/1991 | Durand et al. | 526/125 |

FOREIGN PATENT DOCUMENTS

| | | |
|---|---|---|
| 0099660A1 | 2/1984 | European Pat. Off. . |
| 0136029A2 | 4/1985 | European Pat. Off. . |
| 0313087A1 | 4/1989 | European Pat. Off. . |
| 0315192A1 | 5/1989 | European Pat. Off. . |
| 0366823A1 | 5/1990 | European Pat. Off. . |
| 0407143A2 | 1/1991 | European Pat. Off. . |
| 0413469A2 | 2/1991 | European Pat. Off. . |
| 0428375A2 | 5/1991 | European Pat. Off. . |
| 0471497A1 | 2/1992 | European Pat. Off. . |
| 0493118A2 | 7/1992 | European Pat. Off. . |
| 0500392A2 | 8/1992 | European Pat. Off. . |
| 0507574A2 | 10/1992 | European Pat. Off. . |
| 0534405A1 | 3/1993 | European Pat. Off. . |
| 2075128 | 10/1971 | France . |
| 2312512 | 12/1976 | France . |
| 1248951 | 10/1971 | United Kingdom . |
| 1248953 | 10/1971 | United Kingdom . |
| 1248952 | 10/1971 | United Kingdom . |
| 2099004 | 12/1982 | United Kingdom . |
| WO86/07065 | 12/1986 | WIPO . |

*Primary Examiner*—Joseph L. Schofer
*Assistant Examiner*—Tom Weber
*Attorney, Agent, or Firm*—Fisher, Christen & Sabol

[57] ABSTRACT

In the preparation of polyolefin in a vapor phase polymerization using catalysts comprising a solid catalyst component containing titanium and/or vanadium; and magnesium and an organoaluminum compound, when the reaction is stopped for a certain period of time, the restarting of reaction is possible by feeding in the first place an organoaluminum compound into the reaction system with retaining of polymer particles in the reactor.

10 Claims, 1 Drawing Sheet

Fig. 1

METHOD FOR OPERATING REACTOR FOR POLYMERIZING OLEFINS

BACKGROUND OF THE INVENTION

1. Field of the invention

This invention relates to a method for operating the reactor for producing polyolefins through a vapor phase polymerization method. More particularly, the invention relates to a method for restarting the operation after the interruption of reaction in the preparation of polyolefins through vapor phase polymerization.

2. Description of Prior Art

The vapor phase polymerization method of olefins to prepare a polyolefin is widely employed for the reason that its production cost is low. The system for the vapor phase polymerization is exemplified by a fluidized bed system or a stirred bed system. (cf. British Patent Nos. 1,248,951, 1,248,952, and 1,248,953; U.S. Pat. No. 3,971,768).

In the vapor phase polymerization to prepare polyolefins, various kinds of serious situations happen to occur to interrupt the operation of the reactor due to several troubles or remedy work of equipment. For example, troubles are often caused to occur in the steps of powder treatment, pelletizing and blending subsequent to the polymerization step, or in the cases that temporary storage tanks are filled up with produced polymer particles or a gas blower for recycling is out of order. In these troubles, the polymerization process is stopped not completely but temporarily and, after the remedy of a trouble, the operation is restarted without delay.

For stopping the reaction, a deactivator is sometimes introduced into a reaction system. However, under some other operation conditions, the deactivator is not used so as to avoid undesirable influences that are caused by the deactivator. The term "deactivator" used herein is intended to mean an agent that interrupts a polymerization reaction proceeding at some stage.

Without the use of deactivator, the reaction can be temporarily stopped and started again by the following methods.

(1) The feeds of a solid catalyst component and an organoaluminum compound is discontinued and the feeds of gases including olefin are reduced in proportion to the lowering of the rate of reaction. After the rate of reaction is lowered to a certain level such as to a half or a third of the regular reaction rate, all the feeds of reactant gases are stopped.

(2) The feeds of all gases are stopped simultaneously with the stopping of feeds of solid catalyst component and organoaluminum compound and the pressure and temperature are lowered.

In any stopping process, the pressure and temperature are lowered and gases in the reaction system are purged with an inert gas, and the polyolefin particles remaining in the reaction vessel are discharged.

The reason for the discharge of polyolefin particles is as follows. The concentrations of the solid catalyst component and organoaluminum compound in the remained polymer particles vary in each stopping operation. If the operation is restarted with the remained polymer as it stands, the conditions to start reaction are not settled and vigorous reaction is sometimes caused to occur in the initial stage of reaction or, to the contrary, the starting of reaction takes many hours. In addition, as described later on, the trouble due to the formation of sheet-like polymer is liable to occur.

Accordingly, the restarting may be carried out after feeding the reaction vessel with new polyolefin particles.

The method for emergency stop by introducing a deactivator into a reaction system and its restarting are as follows.

The polymerization reaction is stopped by feeding a deactivator such as carbon monoxide gas or carbon dioxide gas into a reaction vessel (cf. EP-A No. 136029), which is followed by the purging of gases in the reaction system with an inert gas such as nitrogen. After that, the polyolefin particles remaining in the reaction vessel is discharged.

The mechanism to stop the reaction using a deactivator is such that the reaction between a deactivator and a catalyst or co-catalyst is firstly caused to occur and, as a result, the catalyst loses its function to stop the reaction. The reaction between a deactivator and a catalyst or co-catalyst is analyzed to some extent, however, the influences of its reaction products on the polymerization reaction has not been clarified sufficiently. In addition, there is similar apprehension when a deactivator is allowed to remain in the reaction system.

Accordingly, it has been a usual practice that the reaction is stopped by a deactivator as described above, and when the reaction is started again, not only a deactivator and gases including reactant gases but also polyolefin particles remaining in the reaction system are all discharged substantially. After that, polyolefin particles are newly fed into the reaction system and reactant gases and catalysts are then supplied so as to restart the operation.

In this method as described above, the preparation is usually restarted by the following method. The polyolefin particles remaining in a reaction vessel are discharged and the polyolefin particles produced in a regular state or those produced in a separate process are introduced into the reaction vessel, the space within the reaction system is subjected to inert gas purging, and the operation of reaction is started again. In this method, however, all the contents in the reaction system are changed in order to restart, which is not different from the operation of newly starting a reaction.

Furthermore, the fact that the troubles due to the sheet-like polymer is liable to occur in the initial stage of vapor phase polymerization of polyolefin, has already been disclosed (EP-A Nos. 224479, 313087, 315192, and 366823). Accordingly, various troubles due to the formation of sheet-like polymer are caused to occur also in the initial stage of the restarting operation.

As described above, when the vapor phase polymerization of polyolefins is urgently stopped with or without a deactivator and the operation of the reactor is started again, there have been several disadvantages as follows in the conventional method:

(1) The sheet-like polymer is liable to be formed in the initial period of the operation of reactor for polyolefin. The stopping of operation is unavoidable due to the blocking of pipings and valves with the sheet-like polymer.

(2) When the operation is restarted, the feed quantity of catalysts is gradually increased to raise the rate of formation of polyolefin. Accordingly, temporary non-regular conditions are continued during which period a wide specification material is produced.

(3) The reactor must be exposed to the air when the polyolefin particles are discharged or new polyolefin particles are fed. In such an operation, impurities such as moisture and oxygen are liable to be introduced into the reaction system. Therefore, the polymerization reaction is hardly started in the restarting operation necessitating a long time to attain regular operation. This phenomenon is severe when the reaction system is exposed to the air for a long period of time.

Accordingly, it is eagerly wanted to improve the restarting operation after the temporary stopping of the reactor for producing polyolefin.

BRIEF SUMMARY OF THE INVENTION

The object of the present invention is, therefore, to provide a novel and improved method for operating a reactor for polymerizing olefins.

In view of the above object, the inventors of the present invention have carried out extensive investigations. As a result, the present invention has been accomplished with the finding of the facts that the restarting of operation for polymerization can be easily carried out by substantially stopping the reaction with or without the use of a deactivator, and retaining the polymer particles in the reaction vessel without discharging them, and feeding an organoaluminum compound.

According to the present invention, in the method for operating the olefin polymerization reactor comprising the steps of feeding a solid catalyst component containing at least titanium and/or vanadium; and magnesium and an organoaluminum compound into a reaction vessel, polymerizing or copolymerizing olefins under vapor phase regular conditions, stopping the polymerization reaction and then restarting the operation of the reaction; the improvement in the stopping and the restarting of the operation which comprises the steps of performing all the operations to be done from the stopping of reaction to the restarting of reaction with retaining the remaining polymer particles in the reactor without discharging them after the stopping of reaction and feeding an organoaluminum compound to restart the polymerization.

BRIEF DESCRIPTION OF DRAWING

These and other objects and features of the present invention will become more apparent from the following description taken in connection with the accompanying drawing, in which.

Figure 1:
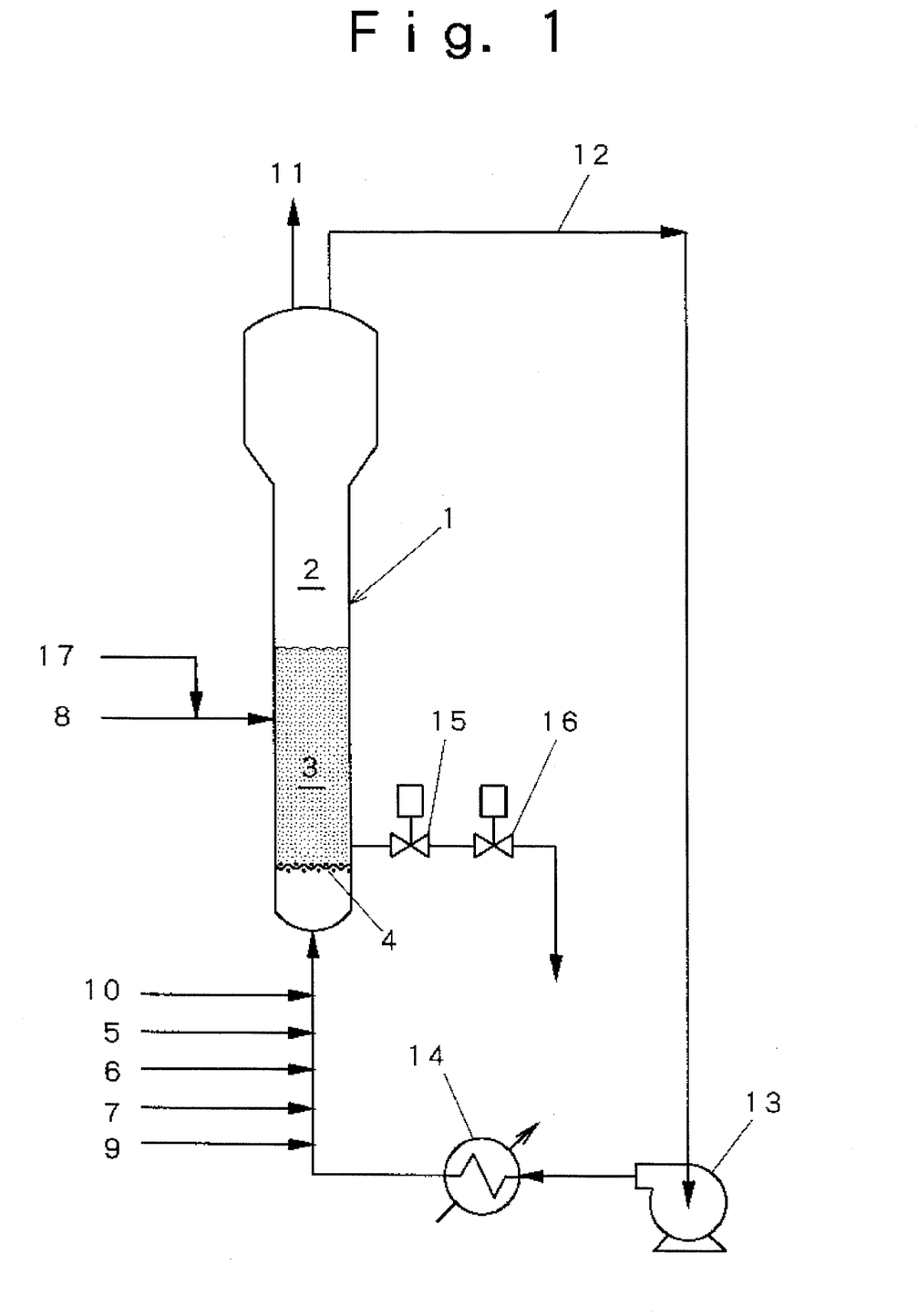
FIG. 1 is a schematic illustration of a vapor phase polymerization apparatus for producing polyolefins, specifically, a fluidized bed apparatus.

Referring to FIG. 1, a conventional fluidized bed reaction system for polymerizing olefins is shown which includes a fluidized bed reactor 1 which comprises an upper vacant zone 2 and a reaction zone 3.

The reaction zone 3 includes a bed of growing polymer particles, formed polymer particles and a minor amount of catalyst particles which are fluidized by the continuous flow of polymerizable gaseous components in the form of a make-up feed and a recycle gas through the reaction zone 3. To maintain a viable fluidized bed, the mass gas flow rate through the bed is normally maintained above the minimum flow required for fluidization.

The portion of the polymerizable gaseous components which do not react in the reaction zone 3 travels upward through the vacant zone 2 above the fluidized bed where entrained particles are given an opportunity to drop back into the bed. This portion of the gas stream is circulated through gas circulation piping 12 as a recycle gas.

The recycle gas is then pressurized with a blower 13 and passed through a cooler 14 to remove the heat of reaction before it is returned to the reaction zone 3.

Fluidization is achieved by a high rate of gas recycle to and through the bed. To insure complete fluidization, the recycle gas and, where desired, part or all of the make-up gas are returned to the bottom of the reactor 1 underneath gas distribution plate 4. Gas distribution plate 4 is positioned under the reaction zone 3 and ensures proper gas distribution and also supports the resin bed when the gas flow is stopped.

The catalyst used in the fluidized bed reaction system is fed, together with nitrogen gas from pipe 17, through a catalyst feed pipe 8 into reaction zone 3.

The fluidized bed reactor 1 is further equipped with a vent pipe 11 adequate to allow venting the bed during the start-up and shut-down of the reactor.

The gases for the reaction are introduced into the recycle gas stream prior to the point where it enters the bottom of reactor 1. Specifically; co-catalyst is introduced from pipe 5, hydrogen is introduced from pipe 6, olefin gas is introduced from pipe 7, gaseous deactivator, e.g. carbon dioxide, is introduced from pipe 9 and nitrogen is introduced from pipe 10.

The fluidized bed is maintained at essentially a constant height by withdrawing a portion of the bed as product at a rate equal to the rate of formation of the particulate polymer product. The particulate polymer product is withdrawn from a point close to the gas distribution plate 4 through polymer particle outlet valves 15 and 16.

DETAILED DESCRIPTION OF THE INVENTION

The present invention will be described in more detail in the following.

The starting olefins used in the present invention have 2 to 8 carbon atoms, preferably 2 to 6 carbon atoms. For example, α-olefins such as ethylene, propylene, butene-1, pentene-1, hexene-1, and 4-methylpentene-1 are used. These olefins can be used singly for homopolymerization or for copolymerization of two or more kinds of them. The combinations of monomers for copolymerization are exemplified by those of ethylene and an α-olefin having 3 to 12 carbon atoms such as ethylene/propylene, ethylene/butene-1, ethylene/hexene-1, and ethylene/4-methylpentene-1; propylene/butene-1; and the combination of ethylene and two kinds or more of α-olefins.

Furthermore, it is possible to copolymerize with dienes for the purpose to improve the properties of polyolefin. Exemplified as the dienes are butadiene, 1,4-hexadiene, ethylidenenorbornene, and dicyclopentadiene.

The feeding of olefins into the reaction system is preferably carried out together with a suitable inert carrier gas such as nitrogen.

The catalysts used for the above polymerization of olefins are composed of a solid catalyst component which contains at least one or both of titanium and vanadium, and magnesium; and an organoaluminum compound. The solid catalyst component containing at least titanium and/or vanadium; and magnesium is exemplified by the one containing titanium and magnesium which is well known as a Ziegler type catalyst used for the polymerization of olefins, the one containing vanadium and magnesium, and the other one containing titanium, vanadium and magnesium.

However, when carbon dioxide gas is introduced into a reactor in order to stop the reaction, it is not preferable to lose the catalytic activity of such a solid catalyst component by the addition of carbon dioxide to substantially lower the polymerization activity. In this occasion, it is desirable that the lowering of polymerization activity is previously checked by a preliminary experiment using a solid catalyst component which has been exposed to carbon dioxide, thereby confirming the influence of carbon dioxide on the solid catalyst component.

The above catalyst components are prepared by adding a titanium compound and/or vanadium compound on a carrier of magnesium-containing inorganic solid compounds such as metallic magnesium, magnesium hydroxide, magnesium carbonate, magnesium oxide, and magnesium chloride, or double salts, double oxides, carbonates, chlorides and hydroxides containing magnesium and an element selected from silicon, aluminum, and calcium, or those obtained by treating or reacting the above inorganic solid compounds with an oxygen-containing compound, sulfur-containing compound, aromatic hydrocarbon or halogen-containing compound.

The above-mentioned oxygen-containing compounds are exemplified by water; polysiloxane; organic oxygen-containing compounds such as alcohols, phenols, ketones, aldehydes, carboxylic acids, esters, and acid amides; alkoxides of metals; and inorganic oxygen-containing compounds such as oxychlorides of metals. The sulfur containing compounds are exemplified by organic sulfur-containing compounds such as thiols and thioethers and inorganic sulfur-containing compounds such as sulfur dioxide, sulfur trioxide, and sulfuric acid. The aromatic hydrocarbons are exemplified by monocyclic or polycyclic aromatic hydrocarbons such as benzene, toluene, xylene, anthracene, and phenanthrene. The halogen-containing compounds are exemplified by chlorine, hydrogen chloride, metal chlorides, and organic halides.

The foregoing titanium compounds are exemplified by halides, alkoxy halides, alkoxides, and oxychlorides of titanium. Among them, tetra-valent titanium compounds and tri-valent titanium compounds are preferably used. The tetra-valent titanium compounds are represented by the general formula:

$$Ti(OR)_n X_{4-n}$$

in which R is a hydrocarbon radical such as an alkyl group, aryl group or aralkyl group having 1 to 20 carbon atoms, X is a halogen atom and n is a numeral of $0<n<4$.

More particularly, the titanium compounds are exemplified by titanium tetrachloride, titanium tetrabromide, titanium tetraiodide, trichlorotitanium monomethoxide, dichlorotitanium dimethoxide, monochlorotitanium trimethoxide, titanium tetramethoxide, trichlorotitanium monoethoxide, dichlorotitanium diethoxide, monochlorotitanium triethoxide, titanium tetraethoxide, trichlorotitanium monoisopropoxide, dichlorotitanium diisopropoxide, monochlorotitanium triisopropoxide, titanium tetraisopropoxide, trichlorotitanium monobutoxide, dichlorotitanium dibutoxide, monochlorotitanium tributoxide, titanium tetrabutoxide, trichlorotitanium monopentoxide, trichlorotitanium monophenoxide, dichlorotitanium diphenoxide, monochlorotitanium triphenoxide, and titanium tetraphenoxide.

The tri-valent titanium compounds are exemplified by the compounds which are prepared by reducing tetra-valent halogenated titanium alkoxides with hydrogen, aluminum, titanium or organometallic compounds of the group I to III of the periodic table. The above tetravalent halogenated titanium alkoxides are represented by the general formula:

$$Ti(OR)_m X_{4-m}$$

in which R is a hydrocarbon radical such as an alkyl group, aryl group or aralkyl group having 1 to 20 carbon atoms, X is a halogen atom and m is a numeral of $0<m<4$.

Among the above titanium compounds, the tetravalent titanium compounds are preferable.

More particularly, the catalysts are exemplified by those prepared by combining organoaluminum compounds with solid catalyst components of:

MgO—RX—TiCl$_4$ (U.S. Pat. No. 4,065,611), Mg-SiCl$_4$—ROH—TiCl$_4$,

MgCl$_2$—Al(OR)$_3$—TiCl$_4$ (U.S. Pat. No. 4,202,953),

MgCl$_2$—SiCl$_4$—ROH-TiCl$_4$ (U.S. Pat. Nos. 4,006,101 and 4,083,802),

Mg(OOCR)$_2$—Al(OR)$_3$—TiCl$_4$ (U.S. Pat. No. 4,022,958),

Mg—POCl$_3$—TiCl$_4$, MgCl$_2$—AlOCl—TiCl$_4$ (U.S. Pat. No. 4,061,857), and MgCl$_2$—Al(OR)$_n$X$_3$—n—Si(OR')$_m$X$_{4-m}$—TiCl$_4$ (U.S. Pat. No. 4,507,448)

in which R and R' are organic residual groups and X is a halogen atom.

The foregoing vanadium compounds are exemplified by tetra-valent vanadium compounds such as vanadium tetrachloride, vanadium tetrabromide, and vanadium tetraiodide; and penta-valent vanadium compounds such as vanadium oxytrichloride and orthoalkyl vanadate; and tri-valent vanadium compounds such as vanadium trichloride and vanadium triethoxide.

The vanadium compounds can be used singly or in combination with the titanium compounds.

Exemplified as other catalysts are the combination of organoaluminum compounds with a solid catalyst component prepared by reacting an organomagnesium compound of the so-called Grignard reagent with a titanium compound and/or a vanadium compound. The organomagnesium compounds are exemplified by the compounds represented by the general formulae: RMgX, R$_2$Mg and RMg(OR), in which R is an organic radical having 1 to 20 carbon atoms and X is a halogen atom, and their ether complexes, and other compounds which are prepared by modifying the above organomagnesium compounds with other organometallic compounds such as organosodium, organolithium, organopotassium, organoboron and organocalcium.

Typical examples of the above catalysts are the compounds prepared by combining an organoaluminum compound with a solid catalyst component such as RMgX-TiCl$_4$ type, RMgX-phenol-TiCl$_4$ type, RMgX-halogenated phenol-TiCl$_4$ type, and RMgX-CO$_2$—TiCl$_4$ type.

Other catalyst systems are exemplified by the combination of an organoaluminum compound with a solid substance which is obtained by reacting an inorganic oxide as a solid catalyst component such as SiO$_2$, Al$_2$O$_3$ and SiO$_2$·Al$_2$O$_3$ with the above-described solid catalyst component containing magnesium and titanium and/or vanadium. Besides the above inorganic oxides of SiO$_2$, Al$_2$O$_3$ and SiO$_2$·Al$_2$O$_3$; CaO, Ba$_2$O$_3$ and SnO$_2$ are also used. Furthermore, the double oxides of the above oxides can also be used. These inorganic oxides are brought into contact with the solid catalyst component containing magnesium and titanium and/or vanadium through a well-known method. More particularly, the reaction is carried out at a temperature in the range of 20° to 400° C., preferably 50° to 300° C., generally for 5 minutes to 20 hours with or without an organic solvent such as an inert hydrocarbon, alcohol, phenol, ether, ketone, ester, amine, nitrile or a mixture of them. The reaction may be carried out by any suitable method such as performing ball milling of all component materials.

Practical examples of the above catalyst systems are combinations of organoaluminum compounds with the solid catalyst component exemplified as follows:

$SiO_2$—ROH—$MgCl_2$—$TiCl_4$ (U.S. Pat. No. 4,315,999), $SiO_2$—ROR'—MgO—$AlCl_3$—$TiCl_4$ (British Patent No. 2,099,004), $SiO_2$—$MgCl_2$—$Al(OR)_3$—$TiCl_4$—$Si(OR')_4$ (U.S. Pat. No. 4,396,534), $SiO_2$—$TiCl_4$—$R_nAlCl_{3-n}$—$MgCl_2$—$Al(OR')_nCl_{3-n}$ (EP-A No. 407143), $SiO_2$—$TiCl_4$—$R_nAlX_{3-n}$—$MgCl_2$—$Al(OR')_nCl_{3-n}$—$Si(OR'')_nCl_{4-n}$ (EP-A No. 413469), $SiO_2$—$MgCl_2$—$Al(OR')_nCl_{3-n}$—$Ti(OR'')_4$—$R_nAlCl_{3-n}$ (EP-A No. 428375)

$SiO_2$—$MgCl_2$—$Al(OR')_nCl_{3-n}$—$Ti(OR'')_nCl_{4-n}$—$R_nAlCl_{3-n}$ (EP-A No. 428375)

$SiO_2$—$TiCl_4$—$R_nAlCl_{3-n}$—$MgCl_2$—$Al(OR')_nCl_{3-n}$—$R''_mSi(OR''')_nX_4$—(m+n) (EP-A No. 493118)

$SiO_2$—$R_nMgX_{2-n}$—$Al(OR')_nCl_{3-n}$—$Ti(OR'')_nCl_{4-n}$—$R'''OH$—$R_nAlX_{3-n}$ (EP-A No. 507574)

$SiO_2$—$MgCl_2$—$Al(OR')_nCl_{3-n}$—$Ti(OR'')_nCl_{4-n}$—$R'''OH$—$R_nAlCl_{3-n}$—$Al(OR')_nCl_{3-n}$ (EP-A No. 500392)

in which R, R', R" and R"' are hydrocarbon residual groups, respectively.

In these catalyst systems, the compounds of titanium and/or vanadium can be used as adducts of organic carboxylic esters. Furthermore, it is possible to use the foregoing inorganic solid compounds after bringing the compounds into contact with organic carboxylic acid esters. Still further, the organoaluminum compounds can be used as an adduct with an organic carboxylic acid ester. In other words, the catalyst systems which are prepared in the presence of organic carboxylic acid esters can be used.

The organic carboxylic acid esters used herein are exemplified by the esters of aliphatic, alicyclic and aromatic carboxylic acids. Among all, aromatic carboxylic acid esters having 7 to 12 carbon atoms are preferable, which are exemplified by alkyl esters such as methyl ester and ethyl ester of benzoic acid, anisic acid, and toluic acid.

The organoaluminum compounds used together with the above-described solid catalyst components are those having at least one of aluminum-carbon atom bond in the molecule.

For example, they are exemplified by:

(i) organoaluminum compounds represented by the general formula:

$$R_mAl(OR')_nH_pX_q$$

in which each of R and R' is a hydrocarbon group having 1 to 15 carbon atoms, preferably 1 to 4 carbon atoms such as alkyl, aryl, alkenyl, or cycloalkyl group. The alkyl groups are exemplified by methyl, ethyl, propyl, isopropyl, isobutyl, sec-butyl, tert-butyl, hexyl and octyl groups. R and R' may be either the same or different ones. X is a halogen atom. The symbols m, n, p and q are, respectively, 0<m<3, 0<n<3, 0<p<3, and 0<q<3 as well as (m+n+p+q)=3, and (ii) alkylated complexes of a metal of the group I of the periodic table with aluminum which is represented by the general formula:

$$MAlR_4$$

in which M is a metal selected from the group of Li, Na and K, and R is the same hydrocarbon group as the above one.

Exemplified as the organoaluminum compounds belonging to the above (i) are:

General formula: $R_mAl(OR')_{3-m}$ in which each of R and R' is the same hydrocarbon group as the above one and m is a numeral preferably in the range of 1.5<m<3.

General formula: $R_mAlX_{3-m}$ in which R is the same hydrocarbon group as the above one, X is a halogen atom and m is a numeral preferably in the range of 0<m<3.

General formula: $R_mAlH_{3-m}$ in which R is the same hydrocarbon group as the above one and m is a numeral preferably in the range of 2<m<3.

General formula: $R_mAl(OR')_nX_q$ in which R is the same hydrocarbon group as the above one, X is a halogen atom, and each of m, n and q is a numeral preferably in the ranges of 0<m<3, 0<n<3, and 0<q<3 and (m+n+q)=3.

The organoaluminum compounds belonging to the group (i) are exemplified by trialkylaluminums such as trimethylaluminum, triethylaluminum, triisopropylaluminum, triisobutylaluminum, tri-sec-butylaluminum, tri-tert-butyl aluminum, trihexylaluminum and trioctylaluminum; trialkenylaluminum; dialkylaluminum alkoxides such as diethylaluminum ethoxide and dibutylaluminum butoxide; alkylaluminum sesquialkoxide such as ethylaluminum sesquiethoxide and butylaluminum sesquibutoxide as well as partially alkoxylated alkylaluminum represented by the average composition of $R_{2.5}Al(OR)_{0.5}$; dialkylaluminum halides such as diethylaluminum chloride, dibutylaluminum chloride, and diethylaluminum bromide; partially halogenated alkylaluminums such as ethylaluminum sesquichloride, butylaluminum sesquichloride, ethylaluminum sesquibromide; partially hydrogenated alkylaluminums such as dialkylaluminum hydrides of diethylaluminum hydride and dibutylaluminum hydride and alkylaluminum dihydrides such as ethylaluminum dihydride and propylaluminum dihydride; and partially alkoxylated and halogenated alkylaluminums such as ethylaluminum ethoxychloride, butylaluminum butoxychloride, and ethylaluminum ethoxybromide.

The organoaluminum compounds belonging to the above group (ii) are exemplified by $LiAl(C_2H_5)_4$ and $LiAl(C_7H_{15})_4$.

As the above organoaluminum compounds belonging to the above (i), it is possible to use the compounds in which two or more aluminum atoms are bonded through oxygen atoms or nitrogen atoms can also be used, which compounds are exemplified by $(C_2H_5)_2AlOAl(C_2H_5)_2$, $(C_4H_9)_2AlOAl(C_4H_9)_2$, and $(C_2H_5)_2AlN(C_2H_5)Al(C_2H_5)_2$.

Among the above-mentioned compounds, trialkylaluminums are most preferable.

The quantity of organoaluminum compound to be used in regular operation is not limited, however, it may be in the range from 0.05 to 1000 moles per 1 mole of titanium compound.

The polymerization according to the present invention is carried out in like manner as the ordinary polymerization of olefins in the presence of a Ziegler type catalyst. That is, the reaction is carried out substantially under a vapor phase condition.

Concerning other polymerization conditions, the temperature is in the range of 10° to 200° C., preferably 40° to 150° C. and the pressure is in the range from the atmospheric pressure to 70 kg/cm².G, preferably 2 to 60 kg/cm².G.

The regulation of molecular weight can be attained effectively by adding hydrogen into a polymerization system although it can be done to some extent by changing the polymerization conditions such as temperature, molar ratios of catalysts or the like.

Furthermore, the reactor for the vapor phase polymerization or copolymerization of olefins includes all the apparatus in fluidized bed system which are substantially operated under a vapor-solid phase system. The installation of a stirrer for a reactor is optional.

In a regular operation, an olefin or olefins, solid catalyst component and organoaluminum compound are constantly fed into the reaction system, meanwhile produced polymer particles are taken out.

As the method for stopping the reaction without adding any deactivator, conventional methods can be employed. For example, (1) The feeding of a solid catalyst component and organoaluminum compound into a reactor is stopped, the feed of gases including olefin is reduced in proportion to the lowering of rate of reaction, and after the rate of reaction is lowered to a certain level, e.g. a half or a third of regular value, all the feeding of reactant gases is stopped; or (2) The feeding of all gases is stopped simultaneously with the stopping of the feeds of solid catalyst component and organoaluminum compound and the pressure and temperature are lowered.

In any method for stopping, the pressure and temperature in the reaction system are lowered and gases in the reaction system are purged with an inert gas such as nitrogen after the termination of reaction.

When a reaction is stopped by introducing a deactivator, it is only necessary to introduce the deactivator into the reaction system. The feeding of olefins, solid catalyst component and organoaluminum compound may be either continued or discontinued. The temperature and pressure in the reaction system may be maintained as they are or lowered sometimes.

The deactivators used in the present invention are exemplified by oxygen, steam, carbon monoxide, carbon dioxide, alcohols such as methanol and ethanol, and ketones such as acetone. These substances may be used in a mixture of two or more kinds. As described in the foregoing passage, when carbon dioxide gas is used as a deactivator, only the organoaluminum compound can be deactivated without substantially deactivating the solid catalyst component by previously testing the influence of the deactivator on the solid catalyst component so as to avoid the lowering of the polymerization activity.

The above-mentioned deactivator can be introduced into the reaction system together with a suitable carrier gas, for example, a reactive gas such as an olefin, or preferably a non-reactive gas such as argon or helium, or more preferably nitrogen.

The strict controlling of the feed quantity of the deactivator is difficult. It is introduced into the reaction system generally in a large excess amount because of the reason that the catalyst must be completely deactivated. After confirming the stop of the reaction, excess deactivator is discharged out of the system. If necessary, the inner part of the reaction system is replaced with an inert gas such as nitrogen.

According to the present invention, the polymer produced by polymerization is held intact in the reactor without being discharged until the operation is restarted. There is no limit in time length to retain the polymer as far as the airtightness of the reaction vessel is maintained and the time of several weeks or longer may be allowable. That is, when a reaction is stopped on account of any trouble in the succeeding processes (e.g. powder treating step, pelletizing step or blending step) or in a circulation gas blower in the reaction system, the polymer can be maintained in a reactor until the necessary repair work is completed.

In the case that a deactivator is supplied, when the quantity of remaining deactivator is small in a reactor, the operation can be restarted by feeding a large quantity of an organoaluminum compound to the reaction system. However, the reaction system is usually supplied with a large quantity of deactivator to stop the reaction, a considerable quantity of deactivator remains in the reaction system before the restarting. Accordingly, the remaining deactivator is preferably discharged as completely as possible before the restarting of operation. For this reason, the purging of reaction system is done using an inert gas to displace the gaseous deactivator with the inert gas. Nitrogen is preferable as the inert gas. The above gas displacement can be done just after the stopping of reaction.

The displacement may be done by continuously passing nitrogen through a reaction system or by pressurizing the reaction system with nitrogen and discharging it through a vent port.

The concentration of gaseous deactivator remaining in the reaction system after the venting is generally less than 10 ppm, preferably less than 1 ppm, and more preferably less than 0.1 ppm. In the case of carbon dioxide, however, the concentration thereof is less than 50 ppm and preferably less than 5 ppm.

According to the present invention, the polymer particles are retained in the reaction system until the restarting of operation, at the same time, the operation is restarted with firstly feeding an organoaluminum compound. In other words, the organoaluminum compound is supplied before the feeding of solid catalyst component. It may be considered that only a solid catalyst component is fed in the first place or both the solid catalyst component and an organoaluminum compound are fed simultaneously. However, in the present invention, it is important that only the organoaluminum compound is fed in the first place.

It is desirable that the feeding of organoaluminum compound before the restarting of operation is carried out with circulating nitrogen in the reaction system in order to make the dispersion of organoaluminum compound uniform.

Incidentally, the pressure to circulate nitrogen is in the range of 0 to 10 kgf/cm$^2$·G, preferably 3 to 6 kgf/cm$^2$·G. The temperature is the same as the polymerization temperature of generally 10° to 200° C., preferably 40° to 150° C.

The quantity of organoaluminum compound to be fed in the restarting of operation may be the same as the feed rate in regular operation, however, it is preferably determined in view of the factors whether the deactivator was used or not and the quantity of organoaluminum compound remained in the reaction system before the stop of reaction.

When the deactivator is not used, the quantity of organoaluminum compound to be fed is such an amount corresponding to 0.2 to 10 aluminum atoms, preferably 0.5 to 5 atoms and more preferably 1 to 2 aluminum atoms per 1 aluminum atom in the organoaluminum compound remaining in the reaction system. Even when a corresponding amount up to more than 10 aluminum atoms is used, any additional effect is not produced which is uneconomical.

When a gaseous deactivator is used, the quantity of organoaluminum compound to be fed is such an amount corresponding to 1 or more aluminum atoms, preferably more than 2 aluminum atoms per 1 aluminum atom in the remaining organoaluminum compound. Even if it is fed to a large excess, the effect thereof is not so increased and it is uneconomical, so that the maximum quantity of the organoaluminum compound to be fed is an amount corresponding to 100 aluminum atoms per 1 aluminum atom in the organoaluminum compound remaining in the reaction system. Especially, when carbon dioxide is used as a gaseous deactivator, an amount corresponding to 2 or more aluminum atoms, more preferably more than 3 aluminum atoms of organoaluminum compound may be fed per 1 aluminum atom of the remaining organoaluminum compound.

The term "reaction system" includes the spaces among polyolefin particles in a reactor, in circulated gases, and the parts inside walls of several apparatus in the reaction system. The rate of feed can be optionally selected. The quantity of organoaluminum compound remaining in the reaction system before the stopping can be determined as a product of the feed rate of organoaluminum compound multiplied by an average residence time in the reactor for polymer particles.

After feeding a predetermined quantity of organoaluminum compound, olefin gases and hydrogen as a molecular weight modifier are fed with the circulation of nitrogen, thereby gradually raising the pressure by these materials. It is preferable that the ratios of the feeds of olefin gases and hydrogen are made equal respectively to the ratios of the final composition in the reaction system.

The solid catalyst component is then supplied into the reaction system together with an inert gas such as nitrogen. The polymerization is started simultaneously with the feeding of the solid catalyst component and the quantity of produced polyolefin is gradually increased to attain the conditions of regular operation.

After that, the polymerization can be made to proceed under regular conditions by feeding predetermined quantities of olefins, solid catalyst component and organoaluminum compound.

The function of carbon dioxide as a deactivator is described in the following.

Although the strict mechanism to stop the reaction with carbon dioxide is not clear, it is considered that carbon dioxide gas reacts with an organoaluminum compound to consume it and, as a result, the polymerization is stopped. In the following description, one of the alkylaluminums, triethyl aluminum ($AlEt_3$) was used as an organoaluminum compound. $AlEt_3$ is extinguished at a temperature below 100° C. through the following reaction formula:

$$CO_2 + AlEt_3 \rightarrow Et_2AlO\cdot CO\cdot Et$$

As a result, $Et_2AlO\cdot CO\cdot Et$ in an equimolar amount with $AlEt_3$ in the reaction system is formed and the latter compound remains in the reaction system.

When the operation is restarted, in order to avoid that the newly added $AlEt_3$ is consumed by the carbon dioxide through the above reaction, the carbon dioxide gas remaining in the reaction system is purged with an inert gas.

$AlEt_3$ is then newly fed. The newly introduced $AlEt_3$ is firstly consumed by the above reaction product of $Et_2AlO\cdot CO\cdot Et$ through the following formula:

$$Et_2AlO\cdot CO\cdot Et + AlEt_3 \rightarrow [Et_2AlO]_2CEt_2$$

$$[Et_2AlO]_2CEt_2 + AlEt_3 \rightarrow Et_2AlOCEt_3 + [Et_2Al]_2O$$

The quantity of newly fed $AlEt_3$ which is consumed by the reaction with the $Et_2AlO\cdot CO\cdot Et$ is 2 times by mole of the $Et_2AlO\cdot CO\cdot Et$ remained in the reaction system. The above final products of $Et_2AlOCEt_3$ and $[Et_2Al]_2O$ are stable and inert to the polymerization reaction.

Accordingly, the newly fed $AlEt_3$ can produce the effect as a co-catalyst when it is fed more than twice by mole of the above $Et_2AlO\cdot CO\cdot Et$, that is, more than twice the moles of $AlEt_3$ which remained in the reaction system when the reaction was stopped. Furthermore, when 3 times by moles as much as the above quantity is fed, the resultant quantity corresponds to the quantity of $AlEt_3$ just before the urgent stop of the reaction. Therefore, it is desirable to feed more than 3 times by mole of $AlEt_3$ in the restarting operation.

In the above description, a trialkyl aluminum of $AlEt_3$ was exemplified as an organoaluminum compound. Any organoaluminum compound having a carbon-aluminum bond has the same function as the above. Accordingly, when carbon dioxide gas is used as a deactivator, any one of organoaluminum compound to be fed is preferably in the quantity corresponding to 2 or more aluminum atoms relative to 1 aluminum atom remained in the reaction system at the stopping of reaction.

In the following, the present invention will be described in more detail with reference to examples and comparative examples. It should be noted, however, that the present invention is by no means restricted to these examples and comparative examples.

EXAMPLE

Preparation Example for Solid Catalyst Components

A 500 ml three-necked flask equipped with a stirrer and a reflux condenser was fed with 50 g of $SiO_2$ which was baked at 600° C., 160 ml of dehydrated hexane and 2.2 ml of titanium tetrachloride. The contents were allowed to react for 3 hours under the refluxing with hexane. After the reaction, the reaction mixture was cooled and 30 ml of diethylaluminum chloride solution in hexane (1 mmol/ml) was added. Reaction was further carried out for 2 hours under the refluxing with hexane and the reaction mixture was dried under reduced pressure at 120° C. to remove the hexane. The thus obtained reaction product is hereinafter referred to as "Component I".

A stainless steel pot of 400 ml in internal volume containing 25 of stainless steel balls of 0.5 inch in diameter, was fed with 10 g of commercially available anhydrous magnesium chloride and 4.2 g of aluminum triethoxide. Ball milling was carried out at room temperature for 16 hours in an atmosphere of nitrogen. The thus obtained reaction product is hereinafter referred to as "Component II".

The above Component II (5.4 g) was dissolved into 160 ml of dehydrated ethanol and the whole solution was fed into a three-necked flask containing Component I. Reaction was carried out for 3 hours under the refluxing of ethanol. After that, drying under reduced pressure was then carried out at 150° C. for 6 hours to obtain a solid catalyst component. The content of titanium was 15 mg per 1 g of the obtained solid catalyst component.

The reaction for the preparation of the solid catalyst component was performed in an inert gas atmosphere to avoid the contamination with moisture.

EXAMPLE 1

A fluidized bed reactor 1 of 25 cm in diameter as shown in FIG. 1 was used.

Seed polymer of 12 kg of linear low density polyethylene having an average diameter of 810 μm was previously dried and it was fed to the reactor. The pressure in the reaction system was raised to 5 kgf/cm²·G with nitrogen gas. By using a blower 13, the gas in the reaction system was circulated at a flow rate of 88 m³/hr through the fluidized bed reactor 1, a gas circulation piping 12, the blower 13 and a cooler 14. The temperature in the system was maintained at 85° C. by regulating the temperature of the circulated gas. The feed rates of gases were so adjusted that the molar ratio of hydrogen/ethylene/butene-1 was 0.1/1/0.4, the concentration of nitrogen was 25 mol. % and the total pressure was 20 kgf/cm$^2$·G.

As a co-catalyst, 1.1 g/hr of triethylaluminum in the form of a hexane solution was fed from a co-catalyst feed pipe 5, and the solid catalyst component containing Ti and Mg obtained in the foregoing Preparation Example was fed from a catalyst feed pipe 8 at a rate of 1.0 g/hr, thereby starting the polymerization reaction. The reaction reached steady state after 12 hours and the operation was smoothly continued after that.

The rate of formation of ethylene-butene-1 copolymer obtained through polymer particle outlet valves 15 and 16 was 4.0 kg/hr. The properties of the product were 0.90 g/10 min. in MFR, 0.921 g/cm$^3$ in density, 780 μm in average particle diameter with clear and white appearance and spherical shape.

The quantity of polymer particles remaining in the fluidized bed reactor was estimated to be 12 kg with the indication of a differential pressure gauge (not shown in the drawing). Accordingly, the average residence time of polymer particles was 3 hours.

In the next step, the feeds of solid catalyst component and triethylaluminum were stopped to cease the polymerization reaction. Just after that, the temperature of the circulation gas at the inlet of the polymerization reactor was raised. At the time when the difference between the inlet gas temperature and the reaction temperature was reduced to one third of the steady state period, the feed of olefins were stopped.

The circulation gas was discharged from a vent pipe 11 to lower the pressure in the system to 6 kgf/cm$^2$·G over 20 minutes. At the same time, the temperature was lowered to 50° C. The gases in the system were discharged with the blower 13 at a rate of 16 m$^3$/hr from the vent pipe. Meanwhile, nitrogen was introduced from a nitrogen feed pipe 10 to maintain the pressure at 6 kgf/cm$^2$·G.

The blower 13 was stopped after 5 hours and gases were discharged from the vent pipe 11 until the pressure in the system was lowered to the atmospheric pressure. The pressure in the system was then raised to 5 kgf/cm$^2$·G with nitrogen and released the pressure to the atmospheric pressure. This operation was repeated three times to purge the olefin gases.

The polymer particles were retained in the fluidized bed reactor for 48 hours.

The pressure in the fluidized bed reactor was raised to 5 kgf/cm$^2$·G with nitrogen and the gas in the reaction system was circulated at a flow rate of 88 m$^3$/hr by using the blower 13. The temperature in the system was raised to 85° C. by adjusting the temperature. After that, triethylaluminum was fed at a rate of 3.3 g/hr for 1 hour (total: 3.3 g). This quantity was almost the same as the triethylaluminum remaining in the reaction system before the stopping of reaction.

In the next succeeding step, gases were fed in the molar ratio of hydrogen/ethylene/butene-1 of 0.1/1/0.4 and the concentration of nitrogen was made 25 mol. % and the total pressure was raised to 20 kgf/cm$^2$·G.

After the total pressure reached 20 kgf/cm$^2$·G, 1.1 g/hr of triethylaluminum and 1.0 g/hr of the solid catalyst component were fed respectively in the like manner as the start of operation. The reaction became steady state after 6 hours and the rate of formation of polymer particles was 4.0 kg/hr like the start of operation. The operation could be continued smoothly.

The ethylene-butene-1 copolymer was 0.89 g/10 min. in MFR and 0.921 g/cm$^3$ in density. These values were consistent with those of the polymer particles obtained in the initial operation.

Incidentally, all the Examples and Comparative Examples disclosed herein were carried out independently. The respective experiments were done with the intervals of several days to several weeks. More particularly, the polymerization apparatus after each experiment was exposed to the air for gas purging according to predetermined procedures. The start of experiment was done likewise. The methods for preparing catalysts were the same. However, prior to each experiment, only a certain amount of catalyst necessary for the experiment was prepared and it was use for only the relevant experiment.

COMPARATIVE EXAMPLE 1

Experiment was carried out in the like manner as in Example 1 except that the feeding of triethylaluminum (3.3 g/hr for 1 hour, 3.3 g in total) before the restarting of operation was not done. That is, the operation was started again by feeding olefins in the same rate as the regular operation and 1.0 g/hr of the solid catalyst component and 1.1 g/hr of triethylaluminum into the reactor.

As a result, the reaction was hardly started and, 12 hours later on, the polymerization was started. In addition, sheet-like polymer was produced after the start of reaction and at 15 hours from the feeding of the solid catalyst component, the operation was stopped because the zone from the fluidized bed reactor to the polymer outlet pipe was blocked.

COMPARATIVE EXAMPLE 2

In Example 1, triethylaluminum was fed at a rate of 3.3 g/hr for 1 hour (3.3 g in total) and the operation was subsequently started. In this Comparative Example, however, the feeding of triethylaluminum was done simultaneously with the feeding of the solid catalyst component. Other operation conditions were the same as those in Example 1.

In other words, in the restarting of operation, olefins, solid catalyst component and triethylaluminum were simultaneously fed and the ratio and rate of feeding of olefins and 1.0 g/hr of solid catalyst component were the same as those in the steady state operation. The feeding of triethylaluminum was done at a rate of 3.3 g/hr which was the same as the value in restarting operation in Example 1.

The polymerization was started 30 minutes after the start of feeding of reactant materials, however, chip-like polymer was formed. After 1 hour, the feed rate of triethylaluminum was changed from 3.3 g/hr to 1.1 /hr which was the feed rate in the regular state in Example 1. After 1 hour and 45 minutes, the operation was stopped because the blocking was caused to occur in the zone from the fluidized bed reactor to the polymer outlet pipe.

COMPARATIVE EXAMPLE 3

The operation was started in the like manner as in Example 1 and after that the polymerization was stopped. All the polymer particles in the fluidized bed reactor were then discharged from the reaction system.

After that, in order to restart the operation, 12 kg of previously dried seed polymer of linear low density polyethylene of 810 μm in average particle diameter was newly fed into the fluidized bed reactor. The inside of the system was purged with nitrogen and operation was done in the like manner as in the start of the initial operation in Example 1. That is, the pressure in the reaction system was raised to 5 kgf/cm$^2$·G with nitrogen gas. By using a blower 13, the gas in the reaction system was circulated at a flow rate of 88 m$^3$/hr through the fluidized bed reactor 1, gas circulation piping 12, blower 13 and cooler 14. The temperature in the system was maintained at 85° C. by regulating the temperature of the circulated gas. The feed rates of gases were so adjusted that the molar ratio of hydrogen/ethylene/butene-1 was 0.1/1/0.4, the concentration of nitrogen was 25 mol. % and the total pressure was 20 kgf/cm$^2$·G.

As a co-catalyst, 1.1 g/hr of triethylaluminum in the form of a hexane solution was fed from a co-catalyst feed pipe 5, and the solid catalyst component containing Ti and Mg obtained in the foregoing Preparation Example was fed from a catalyst feed pipe 8 at a rate of 1.0 g/hr, thereby starting the polymerization reaction.

However, the polymerization was hardly started because of the existence of impurities in the system and it took 4 days to return the operation to regular condition.

EXAMPLE 2

The fluidized bed reactor 1 of 25 cm in diameter shown in FIG. 1 was used in the like manner as in Example 1.

In operation, 12 kg of previously dried linear low density polyethylene of 780 μm in average particle diameter as seed polymer was fed into the fluidized bed reactor. The pressure in the reaction system was raised to 5 kgf/cm$^2$·G with nitrogen gas. By using the blower 13, the gas in the reaction system was circulated at a flow rate of 88 m$^3$/hr through the fluidized bed reactor 1, gas circulation piping 12, blower 13 and cooler 14. The temperature in the system was maintained at 85° C. by regulating the temperature of the circulated gas. The feed rates of gases were so adjusted that the molar ratio of hydrogen/ethylene/butene-1 was 0.1/1/0.4, the concentration of nitrogen was 25 mol. % and the total pressure was 20 kgf/cm$^2$·G.

As a co-catalyst, 1.1 g/hr of triethylaluminum in the form of a hexane solution was fed from a co-catalyst feed pipe 5, and the solid catalyst component containing Ti and Mg obtained in the foregoing Preparation Example was fed from a catalyst feed pipe 8 at a rate of 0.8 g/hr, thereby starting polymerization reaction. Regular operation of reaction was attained after 15 hours and the operation could be continued smoothly after that.

The ethylene-butene-1 copolymer was taken out through polymer particle outlet valves 15 and 16 at a rate of 4.0 kg/hr. It was clear white particles of 0.88 g/10 min. in MFR, 0.9208 g/cm$^3$ in density and 760 μm in average particle diameter.

Incidentally, the quantity of polymer particles remaining in the fluidized bed reactor was estimated to be 12 kg with the indication of a differential pressure gauge (not shown in the drawing). Accordingly, the average residence time of polymer particles was 3 hours.

In the next step, 3 g of carbon monoxide gas was fed into the circulation gas through the gaseous deactivator feed pipe 9 to urgently cease the polymerization reaction. Just after that, the temperature of the circulation gas at the inlet of polymerization reactor was raised rapidly and the rise of differential pressure of the fluidized bed was also stopped, thereby confirming the stopping of the polymerization reaction.

The circulation gas was discharged from a vent pipe 11 to lower the pressure in the system to 6 kgf/cm$^2$·G over 20 minutes. At the same time, the temperature was lowered to 50° C. The gases in the system were discharged through the blower 13 at a rate of 16 m$^3$/hr from the vent pipe. Meanwhile, nitrogen was introduced from a nitrogen feed pipe 10 to maintain the pressure at 6 kgf/cm$^2$·G.

The blower 13 was stopped after 5 hours and gases were discharged from the vent pipe 11 until the pressure in the system was lowered to the atmospheric pressure. The pressure in the system was then raised to 5 kgf/cm$^2$·G with nitrogen and the pressure was released to atmospheric pressure. This operation was repeated three times to purge the carbon monoxide gas.

The polymer particles were retained in the fluidized bed reactor for 20 hours.

The pressure in the fluidized bed reactor was raised to 5 kgf/cm$^2$·G with nitrogen and the gas in the reaction system was circulated at a flow rate of 88 m$^3$/hr by using the blower 13. The temperature in the system was raised to 85° C. by adjusting the temperature. The concentration of carbon monoxide in the circulation gas at this step was 0.1 ppm. After that, triethylaluminum was fed at a rate of 10 g/hr for 2 hours (20 g in total). This quantity corresponded 6.1 times the quantity of triethylaluminum which remained in the polymer particles before the reaction stopping.

In the succeeding step, gases were fed in the molar ratio of hydrogen/ethylene/butene-1 of 0.1/1/0.4 and the concentration of nitrogen was made 25 mol. % and the total pressure was raised to 20 kgf/cm$^2$·G.

After the total pressure reached 20 kgf/cm$^2$·G, 1.1 g/hr of triethylaluminum and 0.8 g/hr of the solid catalyst component were fed respectively in the like manner as the start of operation. The reaction became steady state after 12 hours and the rate of formation of polymer particles was 4.0 kg/hr like the start of operation. The operation could be continued smoothly.

The obtained ethylene-butene-1 copolymer was 0.85 g/10 min. in MFR and 0.9211 g/cm$^3$ in density. These values were consistent with those of the polymer particles obtained in the initial operation.

COMPARATIVE EXAMPLE 4

Experiment was carried out in the like manner as in Example 2 except that the feeding of triethylaluminum (10 g/hr for 2 hours, 20 g in total) before the restarting of operation was not done. That is, the operation was started again by feeding olefins, solid catalyst component and triethylaluminum into the reactor in the same rates as the regular operation.

As a result, the reaction was hardly started and, 14 hours later on, the polymerization was started again. In addition, sheet-like polymer was produced after that and after 18 hours from the feeding of the solid catalyst component, the operation was stopped because the zone from the fluidized bed reactor to the polymer outlet pipe was blocked.

COMPARATIVE EXAMPLE 5

In Example 2, after the purge of carbon monoxide with nitrogen, triethylaluminum was fed at a rate of 10 g/hr for 2 hours and the operation was subsequently started. In this Comparative Example, however, the feeding of triethylaluminum was done simultaneously with the feeding of the solid catalyst component. Other operation conditions were the same as those in Example 2.

In other words, in the restarting of operation, olefins, solid catalyst component and triethylaluminum were simultaneously fed. The feeding of triethylaluminum was done at a rate of 10 g/hr which is the same as in the restarting operation in Example 2.

The polymerization was started 1 hour and 15 minutes after the start of feeding of reactant materials, however, chip-like polymer was formed. After 2 hours, the feed rate of triethylaluminum was changed from 10 g/hr to 1.1 g/hr which was the same as the feed rate in the regular state in Example 2. After 2 hours and 45 minutes, the operation was stopped because the blocking was caused to occur in the zone from the fluidized bed reactor to the polymer outlet pipe.

COMPARATIVE EXAMPLE 6

The operation was started in the like manner as in Example 2 and after that the polymerization was stopped by feeding carbon monoxide gas. All the polymer particles in the fluidized bed reactor were then discharged from the reaction system.

After that, in order to restart the operation, 12 kg of previously dried seed polymer of linear low density polyethylene of 780 μm in average particle diameter was newly fed into the fluidized bed reactor. The inside of the system was purged with nitrogen and the restarting of operation was done in the like manner as in the start of the initial operation in Example 2. That is, the pressure in the reaction system was raised to 5 kgf/cm$^2$·G with nitrogen gas. By using the blower 13, the gas in the reaction system was circulated at a flow rate of 88 m$^3$/hr through the fluidized bed reactor 1, gas circulation piping 12, blower 13 and cooler 14. The temperature in the system was maintained at 85° C. by regulating the temperature of the circulated gas. The feed rates of gases were so adjusted that the molar ratio of hydrogen/ethylene/butene-1 was 0.1/1/0.4, the concentration of nitrogen was 25 mol. % and the total pressure was 20 kgf/cm$^2$·G.

As a co-catalyst, 1.1 g/hr of triethylaluminum in the form of a hexane solution was fed from a co-catalyst feed pipe 5, and the solid catalyst component containing Ti and Mg obtained in the foregoing Preparation Example was fed from a catalyst feed pipe 8 at a rate of 0.8 g/hr, thereby starting the polymerization reaction.

However, the polymerization was hardly stabilized because of the existence of impurities in the system and it took 5 days to return the operation to regular condition.

EXAMPLE 3

The fluidized bed reactor 1 of 25 cm in diameter shown in FIG. 1 was used.

In operation, 12 kg of previously dried linear low density polyethylene of 830 μm in average particle diameter as seed polymer was fed into the fluidized bed reactor. The pressure in the reaction system was raised to 5 kgf/cm$^2$·G with nitrogen gas. By using the blower 13, the gas in the reaction system was circulated at a flow rate of 88 m$^3$/hr through the fluidized bed reactor 1, gas circulation piping 12, blower 13 and cooler 14. The temperature in the system was maintained at 85° C. by regulating the temperature of the circulated gas. The feed rates of gases were so adjusted that the molar ratio of hydrogen/ethylene/butene-1 was 0.1/1/0.4, the concentration of nitrogen was 25 mol. % and the total pressure was 20 kgf/cm$^2$·G.

As a co-catalyst, 0.5 g/hr of triethylaluminum in the form of a hexane solution was fed from the co-catalyst feed pipe 5, and the solid catalyst component containing Ti and Mg obtained in the foregoing Preparation Example was fed from the catalyst feed pipe 8 at a rate of 0.8 g/hr, thereby starting polymerization reaction. Regular operation of reaction was attained after 12 hours and the operation could be continued smoothly after that.

The ethylene-butene-1 copolymer was taken out through polymer particle outlet valves 15 and 16 at a rate of 3.8 kg/hr. It was clear white particles of 1.0 g/10 min. in MFR, 0.9185 g/cm$^3$ in density and 810 μm in average particle diameter.

Incidentally, the quantity of polymer particles remained in the fluidized bed reactor was estimated to be 12 kg according to the indication of a differential pressure gauge (not shown in the drawing). Accordingly, the average residence time of polymer particles was 3.2 hours.

In the next step, 1 lit. of dried air of 20° C. at atmospheric pressure (8.3 mmol as oxygen) was pressurized with nitrogen and was fed into the circulation gas through the gaseous deactivator feed pipe 9 to urgently cease the polymerization reaction. Just after that, the temperature of the circulation gas for cooling was raised rapidly and the rise of differential pressure of the fluidized bed was also stopped, thereby confirming the stopping of the polymerization reaction.

The circulation gas was discharged from the vent pipe 11 to lower the pressure in the system to 5 kgf/cm$^2$·G over 20 minutes. At the same time, the temperature was lowered to 50° C. The gases in the system were discharged through the blower 13 at a rate of 16 m$^3$/hr from the vent pipe. Meanwhile, nitrogen was introduced from the nitrogen feed pipe 10 to maintain the pressure at 5 kgf/cm$^2$·G.

The blower 13 was stopped after 4 hours and gases were discharged from the vent pipe 11 until the pressure in the system was lowered to the atmospheric pressure. The pressure in the system was then raised to 5 kgf/cm$^2$·G with nitrogen and released the pressure to the atmospheric pressure. This operation was repeated three times to purge the oxygen.

The polymer particles were retained in the fluidized bed reactor for 65 hours.

The pressure in the fluidized bed reactor was raised to 5 kgf/cm$^2$·G with nitrogen and the gas in the reaction system was circulated at a flow rate of 88 m$^3$/hr by using the blower 13. The temperature in the system was raised to 85° C. by adjusting the temperature. The concentration of oxygen in the circulation gas at this step was 1 ppm. After that, triethylaluminum was fed at a rate of 5 g/hr for 2 hours (10 g in total). This quantity corresponded 6.3 times the quantity of triethylaluminum which remained in the polymer particles before the stopping of reaction.

In the succeeding step, gases were fed in the molar ratio of hydrogen/ethylene/butene-1 of 0.1/1/0.4 and the concentration of nitrogen was made 25 mol. % and the total pressure was raised to 20 kgf/cm$^2$·G.

After the total pressure reached 20 kgf/cm$^2$·G, 0.5 g/hr of triethylaluminum and 0.8 g/hr of solid catalyst component were fed respectively in the like manner as the initial start of operation. The reaction reached steady state after 16 hours and the rate of formation of polymer particles was 3.8 kg/hr which is similar to the start of operation. The operation could be continued smoothly.

The obtained ethylene-butene-1 copolymer was 0.95 g/10 min. in MFR and 0.9190 g/cm$^3$ in density. These values were consistent with those of the polymer particles obtained in the initial operation.

EXAMPLE 4

The fluidized bed reactor 1 of 25 cm in diameter shown in FIG. 1 was used.

In operation, 12 kg of previously dried linear low density polyethylene of 810 μm in average particle diameter as seed polymer was fed into the fluidized bed reactor. The pressure in the reaction system was then raised to 5 kgf/cm$^2$·G with nitrogen gas. By using the blower 13, the gas in the reaction system was circulated at a flow rate of 88 m$^3$/hr through the fluidized bed reactor 1, gas circulation piping 12, blower 13 and cooler 14. The temperature in the system was maintained at 85° C. by regulating the temperature of the circulated gas. The feed rates of gases were so adjusted that the molar ratio of hydrogen/ethylene/butene-1 was 0.1/1/0.4, the concentration of nitrogen was 25 mol. % and the total pressure was 20 kgf/cm$^2$·G.

As a co-catalyst, 1.1 g/hr of triethylaluminum in the form of a hexane solution was fed from the co-catalyst feed pipe 5, and the solid catalyst component containing Ti and Mg obtained in the foregoing Preparation Example was fed from the catalyst feed pipe 8 at a rate of 1.0 g/hr, thereby starting the polymerization reaction. Regular operation of reaction was attained after 12 hours and the operation could be continued smoothly after that.

The ethylene-butene-1 copolymer was taken out through polymer particle outlet valves 15 and 16 at a rate of 4.0 kg/hr. It was clear white particles of 0.90 g/10 min. in MFR, 0.9210 g/cm$^3$ in density and 780 μm in average particle diameter.

Incidentally, the quantity of polymer particles remained in the fluidized bed reactor was estimated to be 12 kg according to the indication of a differential pressure gauge (not shown in the drawing). Accordingly, the average residence time of polymer particles was 3 hours.

In the next step, 17 g of carbon dioxide gas was fed into the circulation gas through the carbon dioxide feed pipe 9 to urgently cease the polymerization reaction. Just after that, the temperature of the circulation gas for cooling was raised rapidly and the rise of differential pressure of the fluidized bed was also stopped, thereby confirming the stopping of the polymerization reaction.

The circulation gas was discharged from the vent pipe 11 to lower the pressure in the system to 6 kgf/cm$^2$·G over 20 minutes. At the same time, the temperature was lowered to 50° C. The gases in the system were discharged through the blower 13 at a rate of 16 m$^3$/hr from the vent pipe. Meanwhile, nitrogen was introduced from the nitrogen feed pipe 10 to maintain the pressure at 6 kgf/cm$^2$·G.

The blower 13 was stopped after 5 hours and gases were discharged from the vent pipe 11 until the pressure in the system was lowered to the atmospheric pressure. The pressure in the system was then raised to 5 kgf/cm$^2$·G with nitrogen and released the pressure to the atmospheric pressure. This operation was repeated three times to purge the carbon dioxide.

The polymer particles were retained in the fluidized bed reactor for 40 hours.

The pressure in the fluidized bed reactor was raised to 5 kgf/cm$^2$·G with nitrogen and the gas in the reaction system was circulated at a flow rate of 88 m$^3$/hr by using the blower 13. The temperature in the system was raised to 85° C. by adjusting the temperature. The concentration of carbon dioxide in the circulation gas at this step was 4 ppm. After that, triethylaluminum was fed at a rate of 5 g/hr for 2 hours (10 g in total). This quantity corresponded to about 3 times the quantity of triethylaluminum which remained in the polymer particles before the stopping of reaction.

In the succeeding step, gases were fed in the molar ratio of hydrogen/ethylene/butene-1 of 0.1/1/0.4 and the concentration of nitrogen was made 25 mol. % and the total pressure was raised to 20 kgf/cm$^2$·G.

After the total pressure reached 20 kgf/cm$^2$·G, 1.1 g/hr of triethylaluminum and 1.0 g/hr of solid catalyst component were fed respectively in the like manner as the initial start of operation. The reaction reached steady state after 6 hours and the rate of formation of polymer particles was 4.0 kg/hr which is similar to the start of operation. The operation could be continued smoothly.

The obtained ethylene-butene-1 copolymer was 0.91 g/10 min. in MFR and 0.9208 g/cm$^3$ in density. These values were consistent with those of the polymer particles obtained in the initial operation.

COMPARATIVE EXAMPLE 7

Experiment was carried out in the like manner as in Example 4 except that the feeding of triethylaluminum (5 g/hr for 2 hours, 10 g in total) before the restarting of operation was not done. That is, the operation was started again by feeding olefins, solid catalyst component and triethylaluminum in the same rate as the regular operation into the reactor.

As a result, the reaction was hardly started and, 12 hours later on, the polymerization was started. In addition, sheet-like polymer was produced after the start of reaction and at 15 hours from the feeding of the solid catalyst, the operation was stopped because the zone from the fluidized bed reactor to the polymer outlet pipe was blocked.

COMPARATIVE EXAMPLE 8

In Example 4, 5 g/hr of triethylaluminum was fed for 2 hours (10 g in total) after the purging with carbon dioxide gas and the operation was subsequently started. In this Comparative Example, however, the feeding of triethylaluminum was done simultaneously with the feeding of the solid catalyst component. Other operation conditions were the same as those in Example 4.

In other words, in the restarting of operation, olefins, solid catalyst component and triethylaluminum were simultaneously fed and the rate of feeding of olefins and solid catalyst component were the same as those in regular state operation. The feeding of triethylaluminum was done at a rate of 5 g/hr which was the same as the value in the restarting operation in Example 4.

The polymerization was started at 1 hour and 15 minutes after the start of feeding of reactant materials, however, chip-like polymer was formed. After 2 hours, the feed rate of triethylaluminum was changed from 5 g/hr to 1.1/hr which was the feed rate in the steady state in Example 4. After 2 hours and 45 minutes, the operation was stopped because the blocking was caused to occur in the zone from the fluidized bed reactor to the polymer outlet pipe.

COMPARATIVE EXAMPLE 9

The operation was started in the like manner as in Example 4 and the polymerization was stopped by the feed of carbon dioxide gas. All the polymer particles in the fluidized bed reactor were then taken out of the reaction system.

After that, in order to restart the operation, 12 kg of previously dried seed polymer of linear low density polyethylene of 810 µm in average particle diameter was newly fed into the fluidized bed reactor. The inside of the system was purged with nitrogen and operation was done in the like manner as in the start of the initial operation in Example 4. That is, the pressure in the reaction system was raised to 5 kgf/cm$^2$·G with nitrogen gas. By using a blower 13, the gas in the reaction system was circulated at a flow rate of 88 m$^3$/hr through the fluidized bed reactor 1, gas circulation piping 12, blower 13 and cooler 14. The temperature in the system was maintained at 85° C. by regulating the temperature of the circulated gas. The feed rates of gases were adjusted such that the molar ratio of hydrogen/ethylene/butene-1 was 0.1/1/0.4, the concentration of nitrogen was 25 mol. % and the total pressure was 20 kgf/cm$^2$·G.

As a co-catalyst, 1.1 g/hr of triethylaluminum in the form of a hexane solution was fed from a co-catalyst feed pipe 5, and the solid catalyst component containing Ti and Mg obtained in the foregoing Preparation Example was fed from a catalyst feed pipe 8 at a rate of 1.0 g/hr, thereby starting polymerization reaction.

However, the polymerization was hardly started because of the existence of impurities in the system and it took 4 days to return the operation to regular condition.

In view of the above experiments, after causing the vapor phase polymerization of olefins to stop with or without the use of a deactivator and without discharging the polymer particles from the reactor, it is possible to restart and continue the reaction within a short-period of time without any troubles such as blocking with polymer particles, only by feeding a predetermined quantity of organoaluminum compound prior to the feeding of a solid catalyst component.

What is claimed is:

1. In a method for operating a fluidized bed reaction system for polymerizing olefins which comprises the steps of feeding:

a catalyst comprising titanium and/or vanadium; and magnesium, an organoaluminum compound, and olefins into said fluidized bed reaction system, polymerizing or copolymerizing said olefins at steady state under a vapor phase condition, stopping the reaction of said polymerization or copolymerization and restarting said reaction, the improvement in the operation of said restarting of the fluidized bed reaction system comprising the steps of:

(a) stopping the polymerization or copolymerization of olefins by discontinuing the addition of catalyst and the feed of olefin with or without feeding a deactivator, (b) purging the fluidized bed reaction system with an inert gas, (c) restarting the polymerization or copolymerization of olefins by:

(i) feeding an organoaluminum compound into said fluidized bed reaction system without discharging the previously formed polymer particles from the fluidized bed reaction system, wherein when the deactivator is not used, the quantity of organoaluminum compound to be fed is such an amount corresponding to 0.2 to 10 aluminum atoms in said organoaluminum compound relative to 1 aluminum atom in the organoaluminum compound remaining in the fluidized bed reaction system before the stopping of polymerization or copolymerization, and when a gaseous deactivator is used, the quantity of organoaluminum compound to be fed is such an amount corresponding to 1 or more aluminum atoms relative to 1 aluminum atom remaining in the fluidized bed reaction system at the stopping of the polymerization or copolymerization, (ii) then feeding olefins and hydrogen as a molecular weight modifier with the circulation of nitrogen, thereby gradually raising the pressure of the fluidized bed reaction system, and (iii) then supplying the catalyst into the fluidized bed reaction system.

2. The method as claimed in claim 1, wherein said organoaluminum compound is an alkylaluminum.

3. The method as claimed in claim 2 or 1 wherein said polymerization or copolymerization is stopped with a deactivator.

4. The method as claimed in claim 3, wherein said deactivator is one member selected from the group consisting of oxygen, steam, carbon monoxide, carbon dioxide, alcohols and ketones.

5. The method as claimed in claim 3 wherein the deactivator is carbon dioxide.

6. The method as claimed in claim 2 or 1 wherein said polymerization or copolymerization is stopped without a deactivator.

7. The method as claimed in claim 1, wherein said olefin is at least one member selected from the group consisting of ethylene, propylene, butene-1, pentene-1, hexene-1, and 4-methylpentene-1.

8. A method for operating a fluidized bed reaction system for polymerizing olefins comprising:

(a) feeding;

at least one olefin, an organoaluminum compound, and a catalyst comprising titanium and/or vanadium; and magnesium into said fluidized bed reaction system, (b) polymerizing or copolymerizing said at least one olefin at steady state under a vapor phase condition, (c) stopping the polymerization or copolymerization of said at least one olefin by discontinuing the addition of said catalyst and the feed of said at least one olefin with or without feeding a deactivator, (d) purging the fluidized bed reaction system with an inert gas, (e) restarting the polymerization or copolymerization of said at least one olefin, said restarting comprising feeding an organoaluminum compound into said fluidized bed reaction system without discharging the previously formed polymer particles from the fluidized bed reaction system, the feeding of the organoaluminum compound for said restarting being prior to feeding the at least one olefin and the catalyst for said restarting so that catalyst remaining with said previously formed polymer particles is uniformly reactivated by the organoaluminum compound before the at least one olefin is fed for restarting.

9. The method as claimed in claim 8 wherein said organoaluminum compound is an alkylaluminum.

10. The method as claimed in claim 8 or 9 wherein the reaction is stopped without feeding a deactivator.

* * * * *